(12) United States Patent
Jeong

(10) Patent No.: US 7,173,638 B2
(45) Date of Patent: Feb. 6, 2007

(54) MONITOR

(75) Inventor: Dong-Won Jeong, Daegu (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 10/473,343

(22) PCT Filed: May 30, 2002

(86) PCT No.: PCT/KR02/01028

§ 371 (c)(1),
(2), (4) Date: Jan. 9, 2004

(87) PCT Pub. No.: WO02/098144

PCT Pub. Date: Dec. 5, 2002

(65) Prior Publication Data

US 2004/0113924 A1    Jun. 17, 2004

(51) Int. Cl.
*G09G 5/10* (2006.01)

(52) U.S. Cl. .......................... 345/690; 345/63; 345/88; 345/89

(58) Field of Classification Search .................. 345/63, 345/88, 89, 690; 348/254, 674
See application file for complete search history.

(56) References Cited

U.S. PATENT DOCUMENTS

| | | | |
|---|---|---|---|
| 5,325,195 A * | 6/1994 | Ellis et al. ................... | 348/189 |
| 5,987,167 A * | 11/1999 | Inoue .......................... | 382/167 |
| 6,055,073 A * | 4/2000 | Nomura et al. .............. | 358/518 |
| 6,223,283 B1 | 4/2001 | Chaiken et al. | |
| 6,633,343 B2 * | 10/2003 | Ito et al. ...................... | 348/674 |
| 6,636,229 B2 * | 10/2003 | Ishikawa et al. ............. | 345/590 |
| 6,654,028 B1 * | 11/2003 | Yamakawa ................... | 345/690 |
| 6,795,063 B2 * | 9/2004 | Endo et al. .................. | 345/204 |

FOREIGN PATENT DOCUMENTS

| | | |
|---|---|---|
| JP | 08-051642 | 2/1996 |
| JP | 11-088902 | 3/1999 |
| KR | 1020010085279 | 9/2001 |
| KR | 1020020027114 | 4/2002 |

OTHER PUBLICATIONS

Chinese Office Action dated Feb. 10, 2006.

\* cited by examiner

*Primary Examiner*—Amr A. Awad
*Assistant Examiner*—Tom Sheng
(74) *Attorney, Agent, or Firm*—Fleshner & Kim LLP.

(57) ABSTRACT

A monitor is disclosed, in which R/G/B signals provided from a video source are compensated to adapt to the color reproduction of the monitor, thereby obtaining the best picture quality. The monitor includes a video source for outputting one video signal, a color compensator for detecting characteristics of the video signal output from the video source and for comparing the detected characteristics with display characteristics of the monitor to compensate the color of the video signal, a video processor for processing the video signal output from the color compensator, and a display for displaying the video signal output from the video processor.

34 Claims, 2 Drawing Sheets

MONITOR

TECHNICAL FIELD

The present invention relates to a monitor enabling to realize an optimal image quality by compensating an R/G/B signal transmitted from a video source so as to be suitable for a color reproduction characteristic of a monitor.

BACKGROUND ART

Generally, a monitor mainly includes a video processing circuit and a display device such as CRT (cathode ray tube), LCD (liquid crystal display), PDP (plasma display panel), or the like. CRT has been mainly used so far owing to the advantages in aspect of price and resolution. Yet, LCD expands abruptly in market in aspect of space-saving and various functions in accordance with digital signal processing.

A monitor receives horizontal/vertical synchronization signals (HSYNC/VSYNC) and an R/G/B video signal so as to display a corresponding video, and carries out various information interface such as EDID (extended display identification data) and the like with the video source through DDC (display data channel), i.e. SDA (serial data line)/SCL (serial clock line). Moreover, data communication between the monitor and video source is possible when two-way communication enabling standards such as USB (universal serial bus), IEEE 1394, and the like are applied thereto.

In this case, EDID includes various display characteristic information of the display device of the monitor such as white gamma value, R/G/B chromaticity, R/G/B gamma value, brightness, and current value.

A monitor according to a related art, as shown in FIG. 1, includes a microcomputer 11 such as PC, workstation, or the like performing operation & information processing, grasping a display format of an input video by analyzing frequency information of a horizontal/vertical synchronization signal outputted from a video source 1 generating a video to display a corresponding processing matter on a screen through a video card inside, and outputting a control signal so that an R/G/B video signal transmitted from the video source 1 is signal-processed as a form corresponding to a factory mode closest to the corresponding display format, a video processing unit 12 signal-processing the R/G/B video signal transmitted from the video source 1 to be suitable for the corresponding display format in accordance with the control signal of the microcomputer 11, and a CRT 13 displaying an outputs of the video processing unit 12 on the screen.

Operation of the monitor according to the related art is explained as follows.

First of all, the video source 1 of a computer system transmits the horizontal/vertical synchronization and R/G/B video signals to the monitor 2.

The microcomputer 11 of the monitor 2 grasps the format of the input video in accordance with a frequency of the horizontal/vertical synchronization signal, and controls the video processing unit 12 so that the input video is displayed as the factory mode closest to the video format among factory modes set up previously in the monitor 2.

Subsequently, the video processing unit 12 carries out an image processing such as amplification and the like on the input video to be suitable for the factory mode set up by the microcomputer 11, and then displays the image-processed input video through the CRT 13.

In this case, when the R/G/B signal outputted from the video card of the video source 1 is displayed on the monitor 2, a color that the video card demands to realize is different from a color displayed on the CRT 13 as a display device of the real monitor 2. Besides, the color differs in manufactures of the CRT 13. For instance, an R/G/B ratio outputted from the video card to realize white is different from that for realizing white in the CRT 13.

This is because each CRT 13 has an intrinsic color reproduction characteristic. Such a difference of the color reproduction characteristic is not limited to CRT but includes LCD or PDP.

Unfortunately, the monitor according to the related art fails to implement a demanded color due to the color reproduction characteristic of the applied display device and the color reproduction characteristic difference from the video card. Besides, the color difference occurs between the products of CRT.

DISCLOSURE OF THE INVENTION

Accordingly, the present invention is directed to a monitor that substantially obviates one or more of the problems due to limitations and disadvantages of the related art.

An object of the present invention is to provide a monitor enabling to implement an optimal image quality by compensating a video signal, which is transmitted from a video source, to be fit for a color reproduction characteristic of the monitor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a monitor includes a video source outputting a video signal, a color correction unit detecting a characteristic of the video signal outputted from the video source and correcting a color of the video signal by comparing the detected characteristic of the video signal to a display characteristic of the monitor, a video processing unit carrying out a video processing on the color-corrected video signal outputted from the color correction unit, and a display unit displaying the video signal outputted from the video processing unit.

Preferably, the display unit is selected from a group consisting of CRT (cathode ray tube), LCD (liquid crystal display), and PDP (plasma display panel).

Preferably, the video signal detected by the color correction unit is a signal video-processed through the video processing unit.

Preferably, the video signal detected by the color correction unit is a full white signal and a partial white signal.

Preferably, a characteristic information of the video signal detected by the color correction unit includes at least one selected from a group consisting of R/G/B brightness, current, and voltage data.

Preferably, the display characteristic information of the monitor is included in EDID (extended display identification data).

Preferably, the color correction unit includes an A/D conversion unit converting an analog reference video signal for color correction to be video-processed through the video processing unit into a digital reference video signal, a memory unit storing the display characteristic information of the monitor and the digital reference video signal outputted from the A/D conversion unit, an R/G/B voltage ratio operation unit calculating an R/G/B voltage ratio of the digital reference video signal outputted from the A/D conversion unit, an R/G/B white gamma operation unit calculating an R/G/B white gamma value of the reference video signal using the R/G/B voltage ratio calculated by the R/G/B voltage ratio operation unit and the monitor display characteristic information stored in the memory unit, a gamma difference operation unit calculating a difference between the R/G/B white gamma value of the reference video signal outputted from the R/G/B white gamma operation unit and the R/G/B white gamma value included in the monitor characteristic information stored in the memory unit, a D/A conversion unit converting an output of the gamma difference operation unit into analog, and an adder unit overlapping the gamma difference value outputted from the D/A conversion unit with the video signal outputted from the video source for color correction so as to output the overlapped result to the video processing unit.

To further achieve these and other advantages and in accordance with the purpose of the present invention, a monitor includes a video source outputting a video signal, a microcomputer requesting the video source to transmit a video signal for color correction in accordance with a user's color correction request, a color correction unit detecting a characteristic of the video signal outputted from the video source, the color correction unit comparing the detected characteristic of the video signal to a display characteristic of the monitor so as to calculate a color correction value in accordance with a characteristic difference between the detected and display characteristics, the color correction unit correcting a color of the video signal in accordance with the color correction value, a video processing unit carrying out a video processing on the color-corrected video signal outputted from the color correction unit, and a display unit displaying the video signal outputted from the video processing unit.

Preferably, a characteristic information of the video signal detected by the color correction unit includes at least one selected from a group consisting of R/G/B brightness, current, and voltage data.

Preferably, the display characteristic information of the monitor is included in EDID (extended display identification data).

Preferably, the display characteristic of the monitor is stored in the microcomputer or the microcomputer and color correction unit in common.

More preferably, the microcomputer transmits the display characteristic information to the color correction unit at a color correction mode when the display characteristic of the monitor is stored in the microcomputer only.

To further achieve these and other advantages and in accordance with the purpose of the present invention, a monitor includes a microcomputer requesting a video source to transmit a reference video signal for color correction in accordance with a selection of a display mode for user's color correction so as to output a control signal to perform a video processing of the reference video signal outputted from the video source or a general video signal outputted from the video source, a video processing unit carrying out the video processing on the general or reference video signal outputted from the video source in accordance with the control signal outputted from the microcomputer, a display unit displaying an output of the video processing unit on a screen, and a color correction unit detecting a characteristic information of the reference video signal video-processed through the video processing unit, the color correction unit comparing the detected characteristic information to a display characteristic information of the monitor so as to calculate a compensation value in accordance with a display characteristic difference from the video source, and the color correction unit overlapping the compensation value with the general video signal outputted from the video source so as to output the overlapped value to the video processing unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
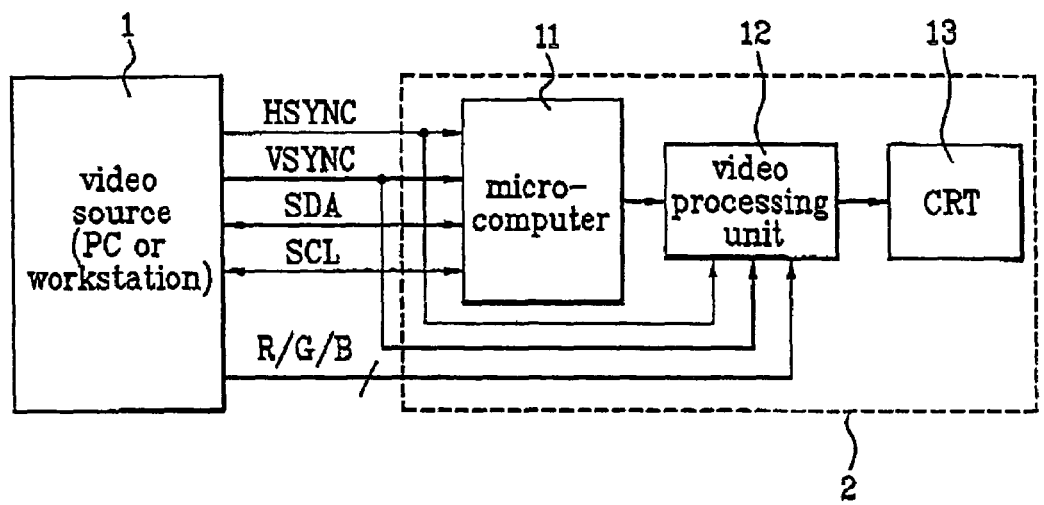
FIG. 1 illustrates a block diagram of a monitor according to a related art.
Figure 2:
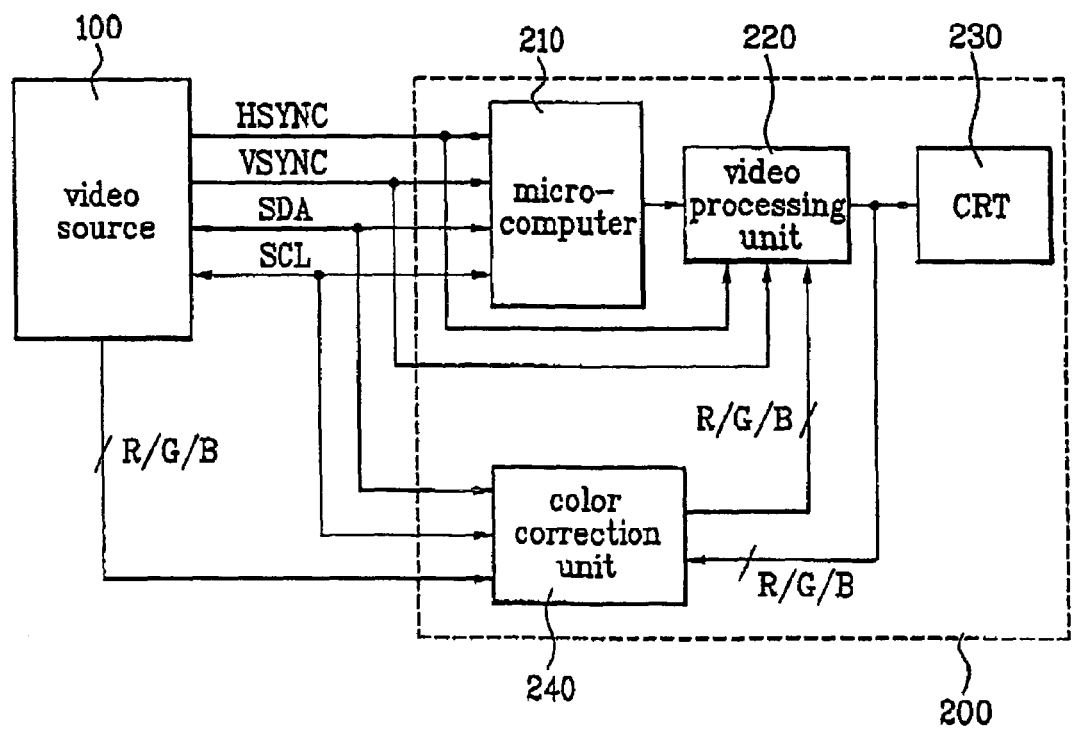
FIG. 2 illustrates a block diagram of a monitor according to the present invention.
Figure 3:
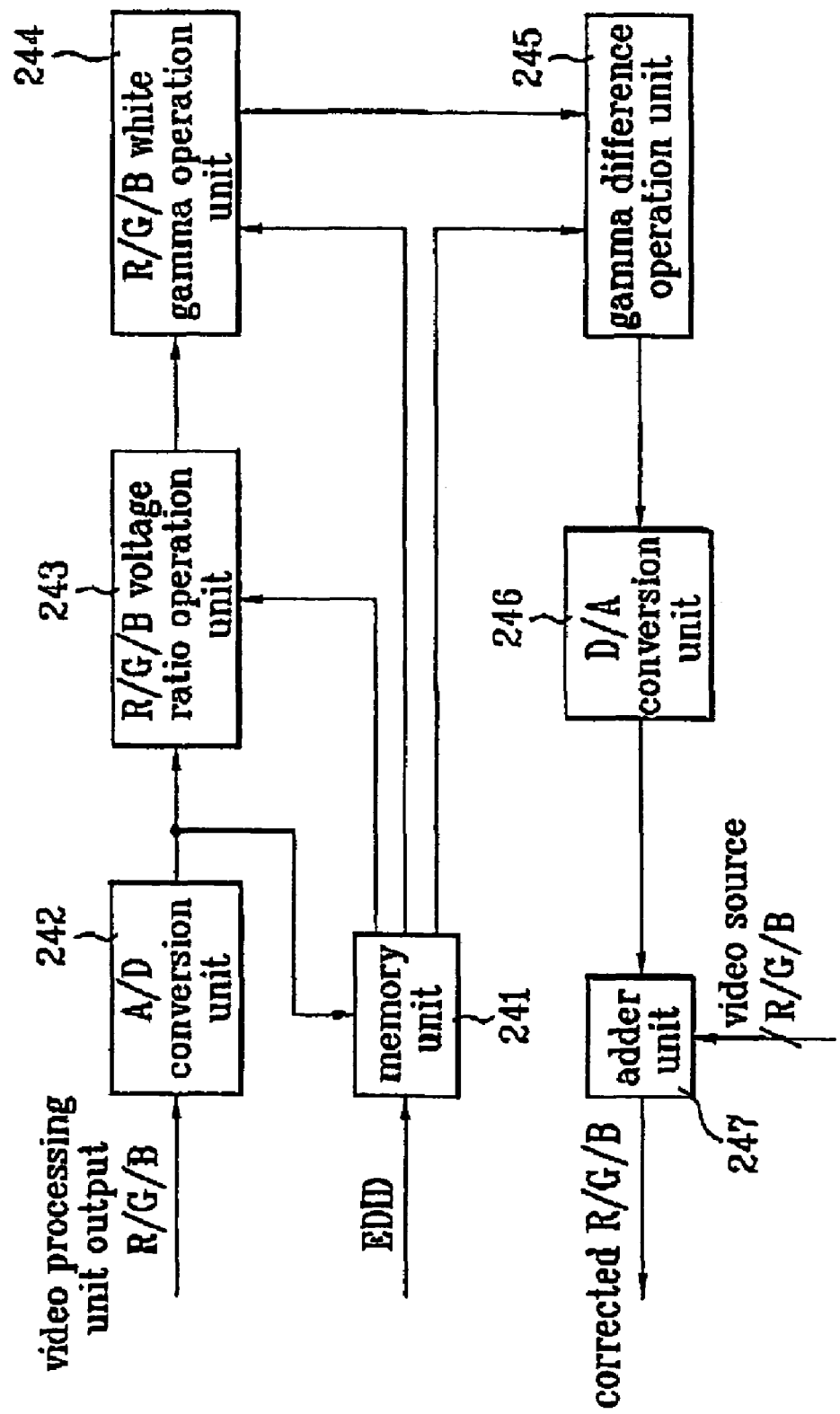
FIG. 3 illustrates a block diagram of a color correction unit in FIG. 2.

FIG. 2 illustrates a block diagram of a monitor according to the present invention, and FIG. 3 illustrates a block diagram of a color correction unit in FIG. 2.

Referring to FIG. 2, a monitor according to the present invention includes a microcomputer 210 requesting a video source 100 to transmit a general video signal or a reference signal in accordance with a selection from a group consisting of a user's general display mode (ex. 1024*768, 800*600, etc.) and a color correction display mode (ex. full white, 70*70 white, etc.) through the above-mentioned two-way communication system (DDC, USB, IEEE 1394) and then outputting a control signal to perform a processing of the video signal outputted from the video source 100, a video processing unit 220 carrying out a video processing on the general or reference video signal outputted from the video source 100 in accordance with the control signal outputted from the microcomputer 210, a CRT 230 displaying an output of the video processing unit 220 on a screen, and a color correction unit 240 detecting a characteristic information of the reference video signal video-processed through the video processing unit 220, comparing the detected characteristic information to a display characteristic information (EDID) of the CRT 230 so as to calculate a compensation value in accordance with a display characteristic difference from the video source, and overlapping the compensation value with the general video signal outputted from the video source 100 so as to output the overlapped value to the video processing unit 220.

In this case, the color correction unit 240 includes an A/D conversion unit 242 converting an analog R/G/B signal, which is inputted sequentially according to a full white mode and a partial white mode video-processed through the video processing unit 220, into digital, a memory unit 241 comprising a register for storing an output value of the A/D conversion unit 242, an R/G/B voltage ratio operation unit 243 calculating a voltage ratio of a digital R/G/B signal according to the full white mode and partial white mode outputted from the A/D conversion unit 242, an R/G/B white gamma operation unit 244 calculating an R/G/B white gamma value using an R/G/B voltage ratio calculated by the R/G/B voltage ratio operation unit 243 and brightness and current data in EDID stored in the memory unit 241, a gamma difference operation unit 245 calculating a difference between the R/G/B white gamma value and a monitor R/G/B white gamma value in EDID stored in the memory unit 241, a D/A conversion unit 246 converting an output of the gamma difference operation unit 245 into analog, and an adder unit 247 overlapping an output of the D/A conversion unit 246 with the R/G/B signal outputted from the video source 100 so as to output the overlapped result to the video processing unit 229.

Color correction of the above-constituted monitor according to the present invention is explained in detail as follows.

First of all, the monitor 200 is connected to the video source 100 through an R/G/B signal line and DDC (SDA/SCL), and power is applied to the monitor. The microcomputer 210 of the monitor 200 then transmits EDID to both of the video source 100 through the DDC and the memory unit 241 of the color correction unit 240.

Subsequently, the microcomputer 210 requests the video source 100 to transmit the reference video signal (R/G/B signal) according to first and second display modes to carry out color correction. In this case, the first and second display modes are available for various formats differing in screen sizes. For instance, let's assume that the first display mode is the full white mode displaying a full screen with white and that the second display mode is the 70*70 white mode displaying a partial screen with white.

Therefore, the video source transmits sequentially the R/G/B signal according to the full white mode and the reference video signal according to the 70*70 white mode.

First of all, the R/G/B signal according to the full white mode is video-processed through the video processing unit 220 so as to be fed back to the color correction unit 240, and converted into digital through the A/D conversion unit 242 of the color correction unit 240 so as to be stored in the R/G/B voltage ratio operation unit 243 and memory unit 241. Successively, the R/G/B signal according to the 70*70 white mode is video-processed through the video processing unit 220 so as to be fed back to the color correction unit 240, and converted into digital through the A/D conversion unit 242 of the color correction unit 240 so as to be stored in the R/G/B voltage ratio operation unit 243 and memory unit 241.

Therefore, the R/G/B voltage operation unit 243 calculates a voltage ratio between the R/G/B signals according to the full and 70*70 white modes stored in the memory unit 241 so as to output the calculated voltage ratio to the R/G/B white gamma operation unit 244.

[Formula 1]

White gamma=$\{\text{Log }(B2/B1)/\text{Log }(A2/A1)\}/\{\text{Log}\}A1/A2)/\text{Log}(V1/V2)\}$, where B1, B2, A1, A2, V1, and V2 are brightness of full white mode, brightness of 70*70 white mode, current of full white mode, current of 70*70 white mode, voltage of full white mode, and voltage of 70*70 white mode, respectively.

Subsequently, the R/G/B white gamma operation unit 244 applies a voltage ratio V1/V2 outputted from the R/G/B voltage ratio operation unit 243 and monitor brightness B1 and B2 and current values A1 and A2 stored in the memory unit 241 to Formula 1, i.e. white gamma calculation formula, so as to calculate am R/G/B white gamma value. The R/G/B white gamma operation unit 244 then outputs the calculated R/G/B white gamma value to the gamma difference operation unit 245.

And, the gamma difference operation unit 245 calculates a difference between the R/G/B white gamma value outputted from the R/G/B white gamma operation unit 244 and a monitor white gamma value in EDID stored in the memory unit 241 so as to output the calculated difference to the A/D conversion unit 246.

Subsequently, the A/D conversion unit 246 converts the gamma difference value outputted from the gamma difference operation unit 245 into analog so as to output the converted gamma difference value to the adder unit 247.

And, the adder unit 247 overlaps the analog-converted gamma difference value with the R/G/B signal outputted from the video source 100 so as to output the white gamma compensated R/G/B signal to the video processing unit 220.

The video processing unit 220 then video-processes the R/G/B signal outputted from the adder unit 247 so as to display the video-processed R/G/B signal through the CRT 230.

Therefore, the video displayed through the CRT 230 is optimized as a demanded color to be realized since the color characteristic difference from the video source 100 is corrected.

INDUSTRIAL APPLICABILITY

Accordingly, the monitor according to the present invention displays precisely the demanded color to be implemented regardless of color implementation characteristics of various video sources by compensating the color characteristic error with the video source due to fluorescent material characteristics. Therefore, the present invention enables to optimize the image quality. Moreover, the present invention standardizes color representation capability of all monitors belonging to the same product group, thereby enabling to maximize a reliance of the product.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A monitor comprising:
a video source outputting a first video signal;
a color correction unit detecting a characteristic of the first video signal outputted from the video source, comparing the detected characteristic of the first video signal to a display characteristic of the monitor to generate a difference value, and overlapping a second video signal from the source with the difference value to generate a color-corrected video signal;
a video processing unit carrying out a video processing on the color-corrected video signal outputted from the color correction unit; and
a display unit displaying the color-corrected video signal outputted from the video processing unit.

2. The monitor of claim 1, wherein the display unit is selected from a group consisting of CRT (cathode ray tube), LCD (liquid crystal display), and PDP (plasma display panel).

3. The monitor of claim 1, wherein the first video signal detected by the color correction unit is a signal video-processed through the video processing unit.

4. The monitor of claim 1, wherein the color correction unit:
   detects voltages of the first video signal in a full white mode and in a partial white mode;
   generates a voltage ratio based on the detected voltages in the full white mode and partial white mode; and
   detects the characteristic of the first video signal based on the voltage ratio.

5. The monitor of claim 4, wherein the characteristic of the video signal and the display characteristic of the monitor are white gamma values.

6. The monitor, of claim 5, wherein the color correction unit generates the difference value based on a difference between the white gamma value of the video signal and the white gamma value of the monitor.

7. The monitor of claim 1, wherein the characteristic of the first video signal detected by the color correction unit includes at least one selected from a group consisting of R/G/B brightness, current, and voltage data.

8. The monitor of claim 1, wherein the display characteristic information of the monitor is included in EDID (extended display identification data).

9. The monitor of claim 1, wherein the first video signal is a reference signal and the second video signal is an RGB signal.

10. The monitor of claim 1, wherein the first and second video signals are RGB signals.

11. A monitor, comprising:
   a video source outputting a first video signal;
   a color correction unit detecting a characteristic of the first video signal output from the video source and correcting a color of the second video signal by comparing the detected characteristic of the first video signal to a display characteristic of the monitor;
   a video processing unit carrying out a video processing on the color-corrected video signal outputted from the color correction unit; and
   a display unit displaying the color-corrected video signal output from the video processing unit, the color correction unit comprising:
   an A/D conversion unit converting the first video signal, corresponding to an analog reference video signal for color correction to be video-processed through the video processing unit, into a digital reference video signal;
   a memory unit storing the display characteristics information of the monitor and the digital reference video signal outputted from the A/D conversion unit;
   an R/G/B voltage ratio operation unit calculating an R/G/B voltage ratio of the digital reference video signal outputted from the A/D conversion unit;
   an R/G/B white gamma operation unit calculating an R/G/B white gamma value of the reference video signal using the R/G/B voltage ratio calculated by the R/G/B voltage ratio operation unit and the monitor display characteristic information stored in a memory unit;
   a gamma difference operation unit calculating a difference between the R/G/B white gamma value of the reference video signal outputted from the R/G/B white gamma operation unit and the R/G/B white gamma value included in the monitor characteristic information stored in the memory unit;
   a D/A conversion unit converting an output of the gamma difference operation unit into analog; and
   an adder unit overlapping the gamma difference value outputted from the D/A conversion unit with the second video signal outputted from the video source for color correction so as to output the overlapped result to the video processing unit.

12. The monitor of claim 11, wherein the first video signal is a reference signal and the second video signal is an RGB signal.

13. The monitor of claim 11, wherein the first and second video signals are RGB signals.

14. A monitor comprising:
   a video source outputting a first video signal;
   a microcomputer requesting the video source to transmit the first video signal for color correction in accordance with a user's color correction request;
   a color correction unit detecting a characteristic of the first video signal outputted from the video source, the color correction unit comparing the detected characteristic of the first video signal to a display characteristic of the monitor so as to calculate a color correction value in accordance with a characteristic difference between the detected and display characteristics, and the color correction unit correcting a color of a second video signal by adding the color correction value to the second video signal from the video source;
   a video processing unit carrying out a video processing on the color-corrected video signal outputted from the color correction unit; and
   a display unit displaying the video signal outputted from the video processing unit.

15. A monitor comprising:
   a microcomputer requesting a video source to transmit a reference video signal for color correction in accordance with a selection of a display mode for user's color correction, so as to output a control signal to perform a video processing of the reference video signal outputted from the video source or an RGB video signal outputted from the video source;
   a video processing unit carrying out the video processing on the RGB or reference video signal outputted from the video source in accordance with the control signal outputted from the microcomputer;
   a display unit displaying an output of the video processing unit on a screen; and
   a color correction unit detecting a characteristic information of the reference video signal video-processed through the video processing unit, the color correction unit comparing the detected characteristic information to a display characteristic information of the monitor so as to calculate a compensation value in accordance with a display characteristic difference from the video source, and the color correction unit overlapping the compensation value with the RGB video signal outputted from the video source so as to output the overlapped value to the video processing unit.

16. The monitor of claim 15, wherein the display characteristic information of the monitor is included in EDID (extended display identification data) and the characteristic information of the reference video signal includes R/G/B brightness, current, and voltage data.

17. The monitor of claim 15, wherein the reference video signal detected by the color correction unit includes a full white signal and a partial white signal.

18. The monitor of claim 15, the color correction unit comprising:
- an A/D conversion unit converting an analog reference video signal for color correction to be video-processed through the video processing unit into a digital reference video signal;
- a memory unit storing the display characteristic information of the monitor and the digital reference video signal outputted from the A/D conversion unit;
- an R/G/B voltage ratio operation unit calculating an R/G/B voltage ratio of the digital reference video signal outputted from the A/D conversion unit;
- an R/G/B white gamma operation unit calculating an R/G/B white gamma value of the reference video signal using the R/G/B voltage ratio calculated by the R/G/B voltage ratio operation unit and the monitor display characteristic information stored in the memory unit;
- a gamma difference operation unit calculating a difference between the R/G/B white gamma value of the reference video signal outputted from the R/G/B white gamma operation unit and the R/G/B white gamma value included in the monitor characteristic information stored in the memory unit;
- a D/A conversion unit converting an output of the gamma difference operation unit into analog; and
- an adder unit overlapping the gamma difference value outputted from the D/A conversion unit with the RGB video signal outputted from the video source for color correction so as to output the overlapped result to the video processing unit.

19. A color correction circuit, comprising:
- a calculation circuit to calculate a ratio of voltages of a reference signal in different video modes; wherein the different video modes includes a full white mode,
- a detector to detect a parameter of a reference signal based on the voltage ratio;
- a comparator to compare the detected parameter of the reference signal to a display parameter of a monitor to generate a difference value; and
- an adder to add the difference value to a video signal received from a video source to generate a color-corrected video signal for display on the monitor.

20. The circuit of claim 19, wherein the detected parameter and the display parameter are white gamma values.

21. The circuit of claim 20, wherein the detector determines the white gamma value of the reference signal based on the voltage ratio and at least one other monitor value.

22. The circuit of claim 21, wherein the at least one other monitor value includes brightness data for the monitor.

23. The circuit of claim 21, wherein the at least one other monitor value includes current data of the monitor.

24. The circuit of claim 21, wherein the detector determines the white gamma value of the reference signal based on the voltage ratio, brightness data of the monitor, and current data of the monitor.

25. The circuit of claim 20, wherein the white gamma value of the reference signal is detected based on the following formula:

White Gamma=$\{Log(B2/B1)/Log(A2/A1)\}/\{Log(A1/A2)/Log(V1/V2)\}$ where B1 is brightness in the full white mode, B2 is brightness in the partial white mode, A1 is current in the full white mode, A2 is current in the partial white mode, V1 is voltage in the full white mode, and V2 is voltage in the partial white mode.

26. The circuit of claim 19, wherein the reference signal and video signal are RGB signals.

27. A monitor, comprising:
- a video source for selectively outputting a first video signal and a second video signal;
- a video processing unit for video-processing the selectively output video signal from said video source;
- a color correction unit for detecting characteristic information of the video-processed first video signal, said color correction unit comparing the detected characteristic information to display characteristic information of the monitor and correcting, based on the comparison, a color of the second video signal output from said video source; and
- a display unit for displaying the video signal output from said video processing unit.

28. The monitor of claim 27, further comprising:
- a microcomputer for outputting a control signal for selecting the output from said video source of one of the first video signal or the second video signal, the output control signal being generated according to a display mode for user color correction.

29. The monitor of claim 28, wherein said color correction unit calculates, based on the comparison, a compensation value according to a display characteristic difference derived from said video source.

30. The monitor of claim 29, wherein said color correction unit performs color-correcting by overlapping, using the compensation value, the second video signal output from said video source and outputs the overlapped second video signal to said video processing unit.

31. The monitor of claim 29, wherein the compensation value is an RGB white gamma value.

32. The monitor of claim 29, wherein the compensation value is calculated based on:

$$\frac{Log\left(\frac{B2}{B1}\right)}{Log\left(\frac{A2}{A1}\right)} \Big/ \frac{Log\left(\frac{A1}{A2}\right)}{Log\left(\frac{V1}{V2}\right)}$$

where B1 and B2 are brightness values for a full white mode and for a partial white mode, respectively, where A1 and A2 are current values for the full white mode and the partial white mode, respectively, and where V1 and V2 are voltage values for the full white mode and the partial white mode, respectively.

33. The monitor of claim 32, wherein the partial white mode is a 70×70 white mode.

34. The monitor of claim 27, wherein the first and second video signals are RGB signals and wherein the first video signal is a reference signal.

* * * * *